Patented July 10, 1934

1,965,948

UNITED STATES PATENT OFFICE 1,965,948

AGE-RESISTER

Waldo L. Semon, Silver Lake Village, Ohio, assignor to The B. F. Goodrich Company, New York, N. Y., a corporation of New York No Drawing. Application August 3, 1933,
Serial No. 683,477

16 Claims. (Cl. 18—50)

This invention relates to the preservation of rubber, and particularly to the preservation of rubber compositions which are subjected to rapidly repeated strains.

Considerable difficulty has been experienced in the past in controlling the deterioration of rubber, and particularly of vulcanized rubber goods which are subjected to rapidly repeated strains, such as pneumatic tires, belts and the like. Such rubber goods, in addition to the natural deterioration which rubber undergoes when exposed to the air, tend to develop fissures in a direction transverse to the strains, which fissures may lead to a premature failure of the goods.

It has now been found that a class of substances which may be designated as alkoxy diarylamines possess the property not only of greatly retarding the ordinary deterioration or rubber, but of greatly increasing its resistance to the formation of the transverse fissures or so-called flexing cracks referred to above.

The substances which fall within the class which forms the subject-matter of this invention have the general structural formula

R—NH—R—O—A where R represents an aromatic nucleus, preferably a simple benzene nucleus, although other nuclei such as those of toluene, xylene, cumene, biphenyl, or even naphthalene may be used in some cases, and A represents an alkyl group, preferably a primary or secondary alkyl group containing more than two carbon atoms, but not more than two simple methylene carbons. The alkoxy group is preferably located in the para position relative to the amino nitrogen. These substances are preferably added to the rubber before vulcanization in small proportions, usually between 0.1 and 5% of the weight of rubber used. The rubber may also be treated therewith in other ways, such as by applying the substances to the surface of the rubber.

For example, a pneumatic tire tread composition may be prepared by mixing 100 parts by weight of rubber, 50 parts of gas black, 5 parts of zinc oxide, 3 parts of pine tar, 3.5 parts of stearic acid, 3 parts of sulphur, 1.25 parts of mercaptobenzothiazole and 1 part of one of the substances referred to above. This rubber composition is vulcanized under pressure in a heated mold for 90 minutes at 280° F. When the substance added to the rubber composition is such an alkoxy diarylamine as p-methoxy diphenylamine, or p-ethoxy diphenylamine it is found that the rubber is capable of withstanding rapidly repeated flexing from 3 to 4 times as long as the same composition without these substances. However, this result is not appreciably better than can be attained by certain commercial anti-oxidants now available, hence it is preferred to use the preferred substances referred to above, in which the alkyl group is either primary or secondary and contains more than two carbon atoms, but not more than two methylene carbons. For instance, if p-propoxy diphenylamine (either normal propyl or iso-propyl) is used in the proportions set forth above, the rubber will resist flexing from 8 to 10 times as long as the untreated rubber. Secondary butoxy diphenylamine, isobutoxy diphenylamine and isopentoxy diphenylamine give comparable results. On the other hand, if tertiary alkyl groups are used (tertiary butoxy diphenylamine), or if the alkyl group contains too many methylene carbons (normal butoxy diphenylamine) the results are distinctly inferior even to those attained by the use of the methoxy and ethoxy compounds first mentioned.

It is to be understood that the invention is not limited to the specific embodiments set forth above for illustrative purposes, but that, on the contrary, it is not intended to limit it except as may be required by the prior art and as set forth in the appended claims.

I claim:

1. The method which comprises treating rubber with a substance having the formula

R—NH—R—O—A wherein R is an aromatic nucleus and A is a primary or secondary alkyl group containing more than two carbon atoms but not more than two methylene carbons.

2. The method which comprises treating rubber with a substance having the formula

R—NH—R—O—A wherein R is a benzene nucleus and A is a primary or secondary alkyl group containing more than two carbon atoms but not more than two methylene carbons.

3. The method which comprises treating rubber with a substance having the formula

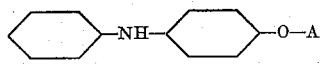

wherein A is a primary or secondary alkyl group containing more than two carbon atoms but not more than two methylene carbons.

4. The method which comprises treating rubber with p-normal propoxy diphenylamine.

5. The method which comprises treating rubber with a substance having the formula

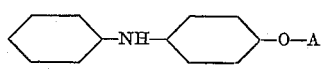

wherein A is a branched chain alkyl group.

6. The method which comprises treating rubber with p-isopropoxy diphenylamine.

7. The method which comprises treating rubber with p-isobutoxy diphenylamine.

8. The method which comprises vulcanizing rubber in the presence of a substance having the formula

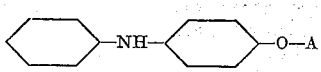

wherein A is a primary or secondary alkyl group containing more than two carbon atoms but not more than two methylene carbons.

9. A rubber composition comprising rubber and a substance having the formula

wherein R is an aromatic nucleus and A is a primary or secondary alkyl group containing more than two carbon atoms but not more than two methylene carbons.

10. A rubber composition comprising rubber and a substance having the formula

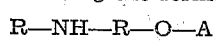

wherein R is a benzene nucleus and A is a primary or secondary alkyl group containing more than two carbon atoms but not more than two methylene carbons.

11. A rubber composition comprising rubber and a substance having the formula

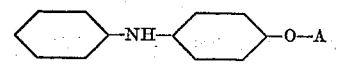

wherein A is a primary or secondary alkyl group containing more than two carbon atoms but not more than two methylene carbons.

12. A rubber composition comprising rubber and p-normal propoxy diphenylamine.

13. A rubber composition comprising rubber and a substance having the formula

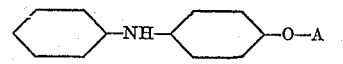

wherein A is a branched chain alkyl group.

14. A rubber composition comprising rubber and p-isopropoxy diphenylamine.

15. A rubber composition comprising rubber and p-isobutoxy diphenylamine.

16. A vulcanized rubber composition which has been vulcanized in the presence of a substance having the formula

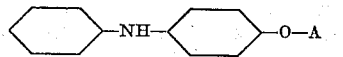

wherein A is a primary or secondary alkyl group containing more than two carbon atoms but not more than two methylene carbons.

WALDO L. SEMON.